United States Patent [19]
Ziegler

[11] Patent Number: 5,211,900
[45] Date of Patent: May 18, 1993

[54] METHOD OF MANUFACTURING AN EUTECTIC BEAM HAVING MULTI-FUNCTIONAL SUPPORT MEMBERS

[75] Inventor: David B. Ziegler, Eden Prairie, Minn.

[73] Assignee: Thermo King Corporation, Minneapolis, Minn.

[21] Appl. No.: 723,365

[22] Filed: Jun. 28, 1991

[51] Int. Cl.5 .................. B29C 39/10; B29C 39/12
[52] U.S. Cl. .................. 264/263; 62/439;
62/530; 165/10; 165/171; 249/91; 249/97;
264/274; 264/275; 264/277; 264/279; 264/310;
425/435
[58] Field of Search .............. 264/275, 310, 311, 301,
264/302, 263, 274, 277, 279, 279.1, 332, DIG.
60; 249/91, 97, 134; 425/435; 62/439, 530, 430;
165/171, 10

[56] References Cited

U.S. PATENT DOCUMENTS

| | | | |
|---|---|---|---|
| 2,378,814 | 6/1945 | Wascher | 264/275 X |
| 3,259,680 | 7/1966 | Schelke | 264/275 |
| 3,520,969 | 7/1970 | Smith | 264/275 X |
| 3,525,966 | 8/1970 | Wierzbinski | 264/275 X |
| 3,537,683 | 11/1970 | Snell, Jr. | 264/275 X |
| 3,793,411 | 2/1974 | Stonitsch et al. | 264/275 X |
| 3,895,470 | 7/1975 | Würth | 249/91 X |
| 3,965,234 | 6/1976 | Lane, Jr. | 264/310 X |
| 4,119,695 | 10/1978 | Asserback | 249/91 X |
| 4,143,193 | 3/1979 | Rees | 264/310 X |
| 4,159,605 | 7/1979 | Ilukowicz | 249/91 X |
| 4,312,687 | 1/1982 | Sigworth, Jr. | 264/275 X |
| 4,422,305 | 12/1983 | Grosskopf . | |
| 4,517,231 | 5/1985 | May et al. | 264/310 X |
| 4,741,875 | 5/1988 | Carraro | 264/311 X |
| 4,824,627 | 4/1989 | Hammer et al. | 264/275 X |
| 4,976,910 | 12/1990 | Gatley et al. | 264/310 X |

FOREIGN PATENT DOCUMENTS

| | | | |
|---|---|---|---|
| 55-73456 | 6/1980 | Japan | 264/275 |
| 1325546 | 8/1973 | United Kingdom | 264/275 |
| 2007581 | 5/1979 | United Kingdom | 264/275 |
| 2180191 | 3/1987 | United Kingdom . | |

*Primary Examiner*—Karen Aftergut
*Attorney, Agent, or Firm*—D. R. Lackey

[57] ABSTRACT

A eutectic beam, and method of constructing same, which includes a plastic housing, a eutectic solution, and a generally U-shaped evaporator tube having first and second spaced leg portions, ends of which extend outside the housing. The leg portions of the evaporator tube are supported by spaced plastic support elements which include cylindrical portions which snugly but slidably encircle the leg portions, and which further include support legs which extend outwardly from the cylindrical portion and are bonded to the housing. In a method step, the plastic support elements are positioned within a rotational mold at the time the plastic housing is formed, with the plastic support elements locating and supporting the evaporator tube within the mold cavity, and with the outer ends of the support legs becoming embedded in walls of the housing during rotational molding.

6 Claims, 7 Drawing Sheets

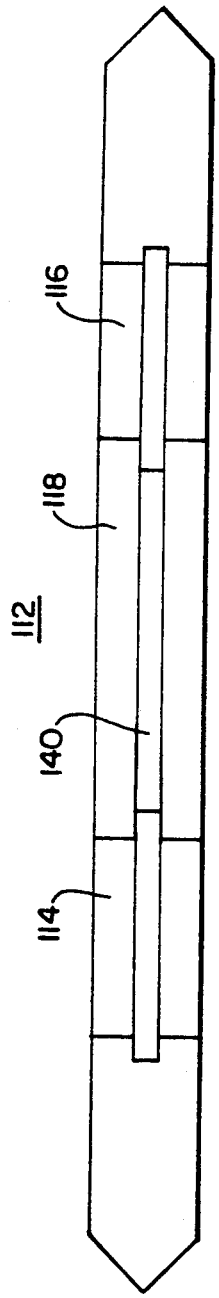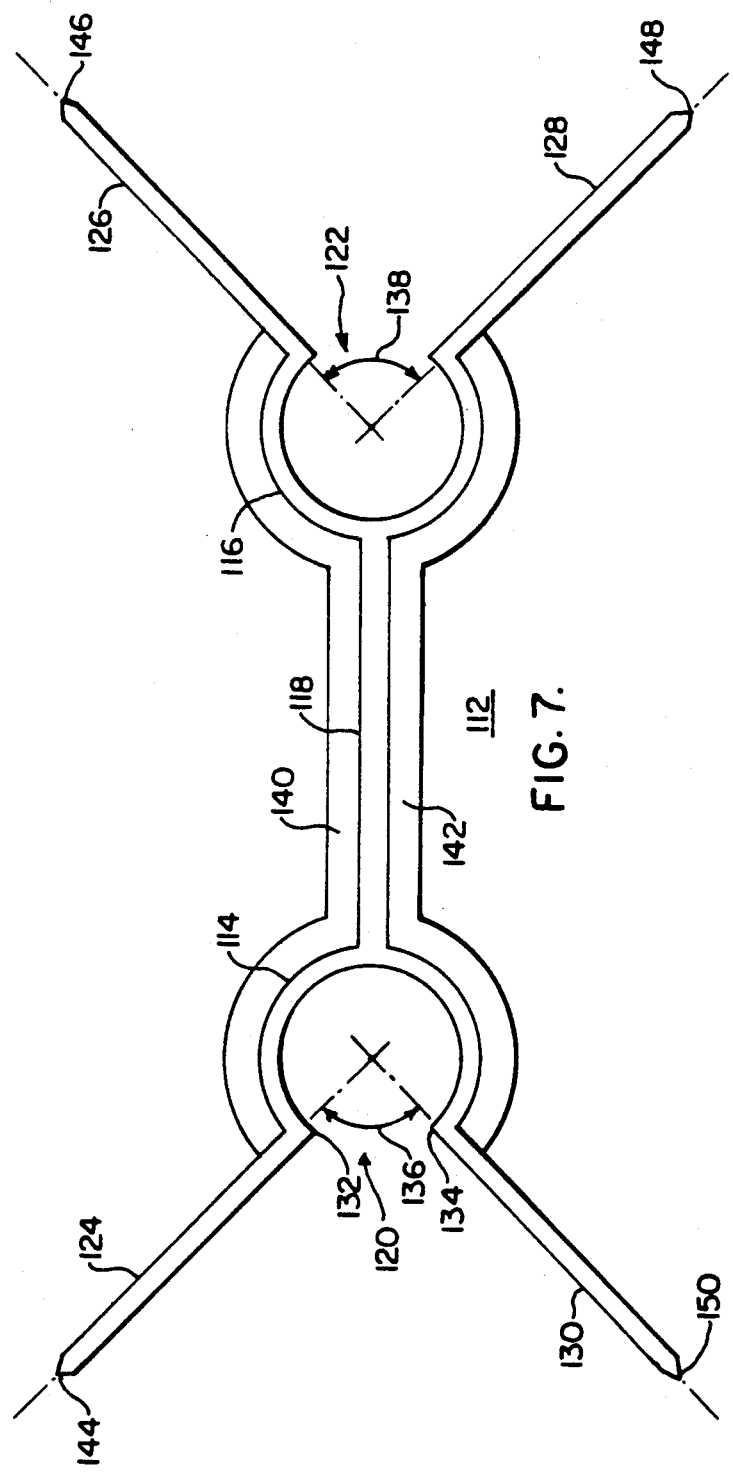

5,211,900

METHOD OF MANUFACTURING AN EUTECTIC BEAM HAVING MULTI-FUNCTIONAL SUPPORT MEMBERS

TECHNICAL FIELD

The invention relates in general to cooling devices, and more specifically to refrigeration capacity storage or hold-over units commonly called eutectic plates or eutectic beams.

BACKGROUND ART

Eutectic beams are commonly used to refrigerate the cargo spaces of delivery trucks. A eutectic beam works on the principal of heat transfer during freezing and melting of a eutectic solution, such as sodium nitrate ($NaNO_3$), ammonium chloride ($NH_4Cl$), brine, and the like. The specific eutectic solution used is determined by the desired temperature of the cargo space. A eutectic beam may be charged during night storage of an associated truck, for example, by connecting the eutectic beam to an external condensing unit via flexible hoses; or, by operating a refrigeration system on the truck from a commercial power supply. If the truck has a refrigeration system, a eutectic beam may also be charged while the truck is in use.

A eutectic beam comprises a housing, a eutectic solution in the housing, and a metallic cooling pipe in the eutectic solution. When the eutectic solution is to be frozen, a refrigeration system, ie., a condensing unit, is connected to the metallic cooling pipe, and a refrigerant is passed through the metallic pipe. The metallic pipe functions as an evaporator, removing heat from the eutectic solution until it is frozen. For purposes of simplicity, the metallic pipe in a eutectic beam will be hereinafter called the evaporator tube.

Eutectic beams commonly utilize plastic for the housing, such as polyethylene, with the metallic evaporator tube being constructed either of copper, or steel tubing coated with a 1 mm thick protective layer of polyethylene. Plastic is commonly used for the housing, instead of metal, because of corrosion problems.

The plastic housing of eutectic beams of which I am aware has a generally rectangular housing having side walls and end walls, and the evaporator tube has a generally U-shaped configuration which includes a curved bight and first and second leg portions. The ends of the leg portions extend in liquid-tight relation through one end wall, and the bight is supported by the opposite end wall by a sliding clamp mounting arrangement which allows for differences in thermal expansion. The housing is usually formed by rotational molding or rotational casting, with two unions at the ends of the leg portions being mounted in one end wall of the mold and the mounting arrangement for supporting the bight being mounted in the other end wall of the mold, prior to introduction of the plastic in the mold. The mold is then chilled and the housing with the evaporator tube is stripped from the mold.

The evaporator tube is quite long, measured from the end wall which supports the two leg portions to the support at the midpoint of the bight. Thus, as the eutectic turns to liquid during usage in a truck, the evaporator tube flexes as the truck encounters bumps and seams in the road, with this constant flexing leading to fatigue cracks in the metal evaporator tube. Fatigue cracks allow refrigerant to escape when the evaporator tube is connected to a refrigeration system. Thus, it would be desirable, and it is an object of the invention, to provide a new and improved eutectic beam which significantly reduces the development of fatigue cracks during usage of the eutectic beam.

SUMMARY OF THE INVENTION

Briefly, the present invention includes a method of manufacturing a eutectic beam which includes an U-shaped evaporator tube having first and second spaced leg portions, and a housing. The method includes the step of providing plastic support means which includes a generally cylindrical portion having support legs which extend outwardly therefrom. The cylindrical portion defines an opening dimensioned to enable the support means to snugly but slidably surround the leg portion. The support legs have first ends integral with the cylindrical portion and second ends.

The method further includes the step of providing a rotational mold which includes cooperative mold parts having surfaces which define a cavity. The rotational mold includes a wall portion which defines openings through which ends of the first and second leg portions of the evaporator tube may extend The method also includes the steps of placing the plastic support means on the evaporator tube, placing the U-shaped evaporator tube in a mold part, and assembling the mold parts such that second ends of the support legs of the plastic support means contact predetermined inner surfaces of the mold cavity. The method thus positions the evaporator tube within the mold cavity via the wall portion of the rotational mold through which the first and second leg portions of the evaporator tube extend, and via the second ends of the support legs of the plastic support means. The method concludes with the step of rotationally molding a plastic housing about the evaporator tube such that second ends of support legs of the plastic support means become embedded in wall portions of the plastic housing. Thus, the plastic support means, which initially positioned and supported the evaporator tube during rotational molding of the housing, additionally provides support for the evaporator tube during use of the eutectic beam.

In a preferred embodiment of the invention the opening defined by the cylindrical portion has a substantially C-shaped configuration, such that the plastic support means may be placed on a leg portion of the evaporator tube by the steps of flexing the plastic support means to momentarily increase the unstressed dimension of the spacing in the C-shaped configuration, and snapping the support means about a leg portion of the evaporator tube.

The invention further includes a eutectic beam having a plastic housing defined by a plurality of wall portions having inner and outer surfaces, a eutectic solution in the housing, a generally U-shaped evaporator tube in the eutectic solution having first and second spaced leg portions, ends of which extend through a wall portion of said housing which are adapted for connection to a refrigeration system, and plastic support means for the evaporator tube within the housing which extends from the evaporator tube to predetermined inner surfaces of the housing. The plastic support means includes at least first and second cylindrical portions which slidably encircle the first and second leg portions of the evaporator tube, with at least two support legs extending outwardly from each cylindrical portion. Each of the support legs has a first end integrally attached to a cylindrical portion and a second end bonded to a predetermined inner surface of the housing. In a preferred embodiment of the invention the opening defined by the cylindrical portion has a substantially C-shaped configuration, allowing volumetric expansion and contraction of the housing during freezing and thawing of the eutectic solution, as well as support for the evaporator tube which allows movement between the evaporator tube and support elements during thermal expansion and contraction.

BRIEF DESCRIPTION OF THE DRAWINGS

The invention will become more apparent by reading the following detailed description in conjunction with the drawings, which are shown by way of example only, wherein:

FIG. 7 is an elevational view of an evaporator tube support element constructed according to another embodiment of the invention;

FIG. 8 is a plan view of the evaporator tube support element shown in FIG. 7.

DESCRIPTION OF PREFERRED EMBODIMENTS

Figure 1:
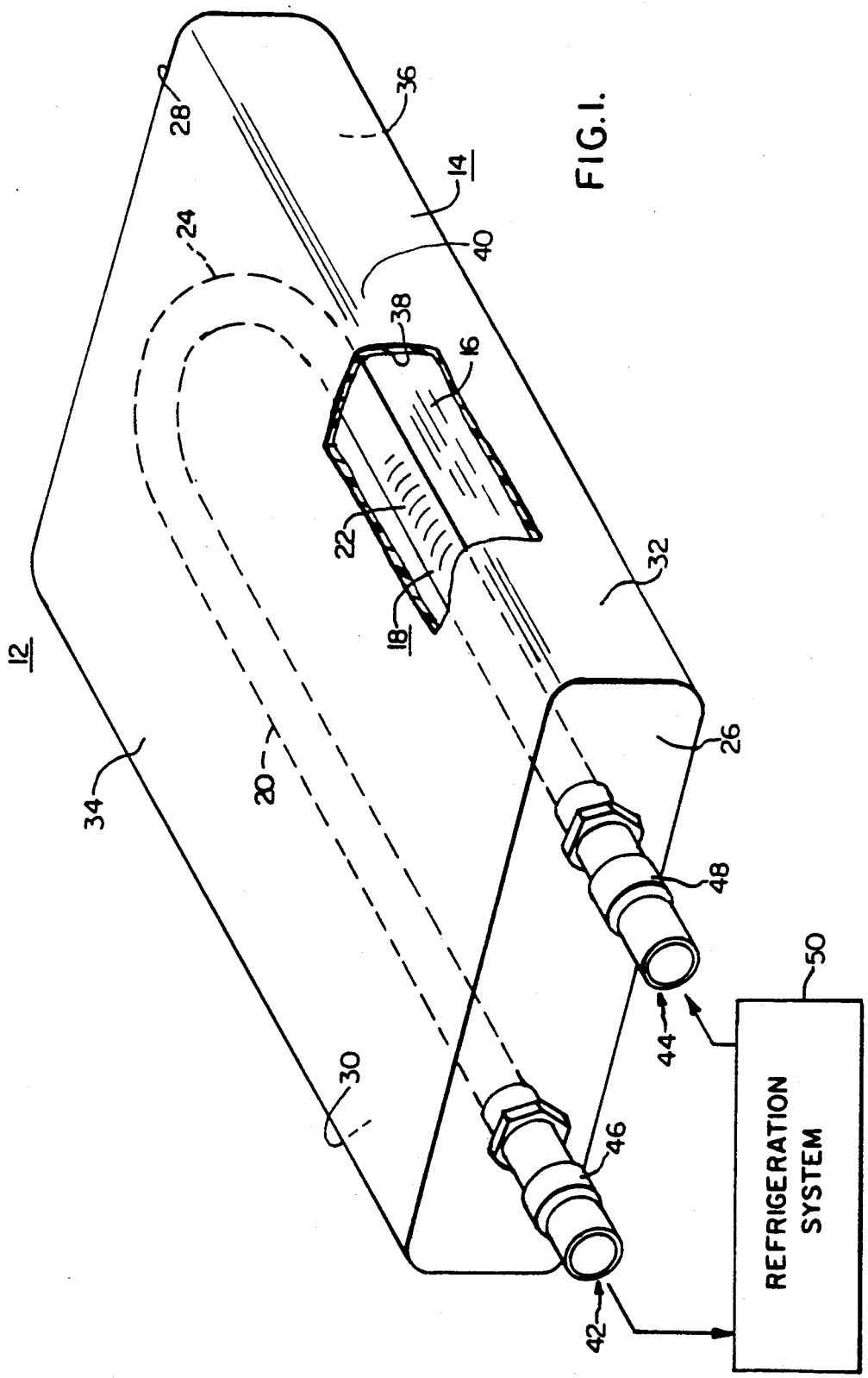
FIG. 1 is a perspective view, partially cut away, of a eutectic beam having a housing and an evaporator tube, which may be constructed according to the teachings of the invention.

Referring now to the drawings, and to FIG. 1 in particular, there is shown a eutectic beam 12 of the type which may be constructed according to the teachings of the invention. Eutectic beam 12 includes a rather flat, elongated housing 14, a eutectic solution 16 in housing 14, and a cooling pipe or evaporator tube 18.

Evaporator tube 18, which has a generally U-shaped configuration, includes first and second spaced, parallel leg portions 20 and 22, and an interconnecting bight 24. The first and second leg portions 20 and 22 extend in liquid tight relation through a common end wall 26 of housing 14, with end wall 26 also mounting and providing support for evaporator tube 18. Housing 14 includes a second end wall 28, first and second side walls 30 and 32, a top 34, and a bottom 36, all of which collectively define inner and outer surfaces 38 and 40, respectively.

Leg portions 20 and 22 terminate in ends 42 and 44, respectively, which are outside housing 14, with ends 42 and 44 including fittings 46 and 48 which are adapted for connection to a refrigeration system 50. Refrigeration system 50, as is well known in the art, conventionally includes a refrigerant compressor driven by a suitable prime mover, and a condensing unit. The eutectic beam 12, when connected to refrigeration system 50 for charging, provides the function of an evaporator unit for refrigeration system 50.

Evaporator tube 18 is conventionally constructed of thin walled copper tubing, and since the dimension of the evaporator tube from the supporting end wall 26 to the bight 24 can be quite long, fatigue cracks develop in the evaporator tube during usage. I have developed plastic support means for the first and second leg portions 20 and 22 of the evaporator tube 18 which may be spaced two to three feet (60–90 cm) apart along the length of the evaporator tube. The plastic support means allows volumetric expansion and contraction of the housing 14 during freezing and thawing, the plastic support means allows thermal expansion and contraction of the evaporator tube 18 relative to the housing, and the plastic support means provides desirable functions during the manufacture of the eutectic beam as well as during usage thereof.

Figure 3:
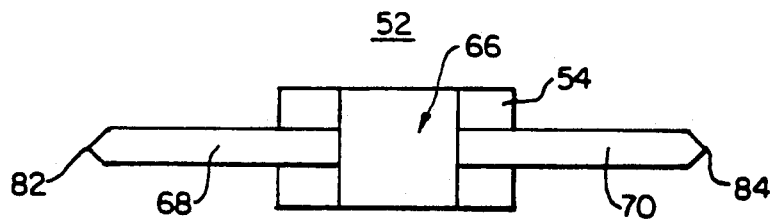
FIG. 3 is a plan view of the evaporator tube support element shown in FIG. 2.
Figure 2:
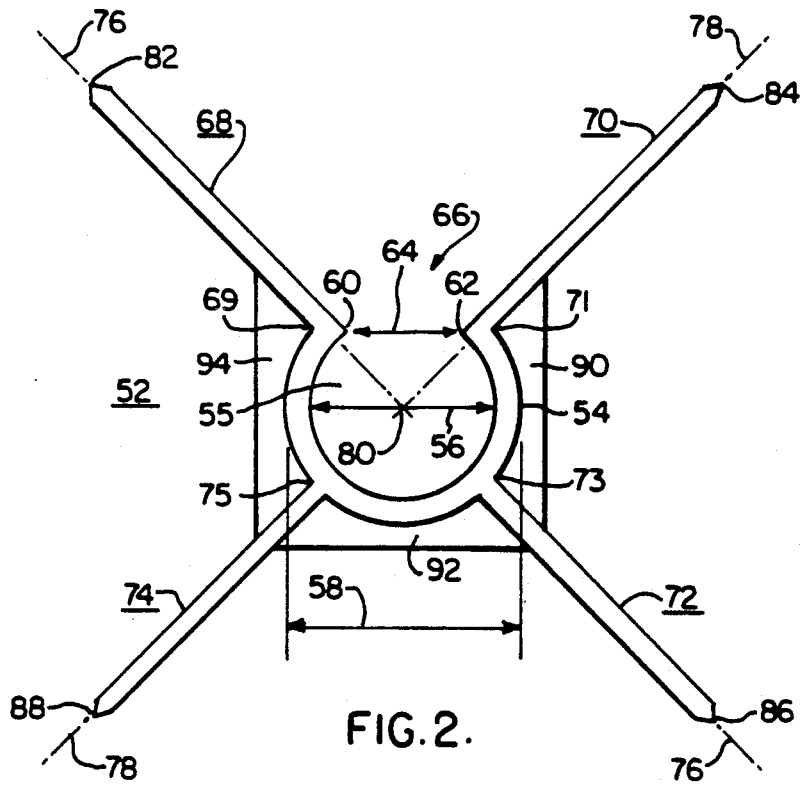
FIG. 2 is an elevational view of an evaporator tube support element constructed according to a first embodiment of the invention.

FIGS. 2 and 3 are side elevational and plan views, respectively, of plastic support means 52 constructed according to a first embodiment of the invention, in which the plastic support means 52 includes a single support element 54 for snugly but slidably surrounding one of the leg portions 20 or 22 of the evaporator tube 18. Support element 54 is a generally cylindrical, tubular portion of plastic support means 52, defining an opening 55 having an inside diameter 56 selected to be about the same as the outside diameter of a leg portion of evaporator tube 18, and an outside diameter 58 selected to provide the desired strength and resiliency.

In a preferred embodiment of the invention, the wall of cylindrical portion 54 does not define a complete circle, having a substantially C-shaped configuration in cross section. Ends 60 and 62 of the C-shaped configuration are spaced by a dimension 64 selected to enable the associated open side 66 of cylindrical portion 54 to be pressed against a leg portion 20 or 22, flexing the cylindrical portion and increasing the dimension 64 until the cylindrical portion snaps about the leg portion. This aspect of the invention facilitates manufacture of eutectic beam 12, and it provides desirable functions during usage thereof, as will be hereinafter explained.

Plastic support means 52 includes a plurality of circumferentially spaced support legs, with four legs 68, 70, 72 and 74 being preferred. Support legs 68, 70, 72 and 74 extend radially outward from the cylindrical portion 54, including first ends 69, 71, 73 and 75 integrally attached to cylindrical portion 54, and second ends 82, 84, 86 and 88. In a preferred embodiment, support legs 68 and 72 are aligned, and support legs 70 and 74 are aligned, such that a plane 76 through support legs 68 and 72 is orthogonal to a plane 78 through support legs 70 and 74, intersecting at 80, the center of cylindrical portion 54. Support legs 68, 70, 72 and 74 are dimensioned such that their respective second or outer ends 82, 84, 86 and 88 will contact opposite surfaces of a cavity in a rotational mold, as will be hereinafter explained. Ends 82, 84, 86 and 88 may be tapered to increase the bonding surface area near the ends, for purposes which will also be hereinafter explained.

In order to provide additional stiffening and support to plastic support means 52, without adversely affecting the ability of support means 52 to flex and snap about a leg portion 20 or 22, integral webs or ribs 90, 92 and 94 may be provided on the three closed sides of cylindrical portion 54. Webs 90, 92 and 94 lie in a common plane disposed centrally through cylindrical portion 54, bisecting the length dimension of cylindrical portion 54. Web 90, in addition to being integrally attached to cylindrical portion 54, is additionally integrally attached to support legs 70 and 72. In like manner, web 92 is integrally attached to cylindrical portion 54 and support legs 72 and 74, and web 94 is integrally attached to cylindrical portion 54 and support legs 74 and 68.

Plastic support means 52 is formed of a plastic material selected to be compatible with the plastic material of which housing 14 is formed. In a method of manufacturing eutectic beam 12, housing 14 is rotationally molded in a process in which powdered or small granules of plastic, preferably polyethylene, are introduced into a mold cavity, with the walls of the mold being heated to melt the plastic and form the housing wall on the inner surfaces of the mold cavity. The plastic used to manufacture support means 52 must be compatible with both the plastic used to form housing 14, and the preferred rotational casting or molding method used to make housing 14. Compatibility with the plastic of the housing 14 means that an excellent bond devoid of leak-causing air bubbles must be formed between the ends 82, 84, 86 and 88 of the support legs 68, 70, 72 and 74, and the plastic of housing 14. Compatibility with the rotary molding process means that the plastic used to construct support means 52 must maintain its physical integrity when in contact with the hot mold. A slight softening of the outer surface in contact with the rotary mold and hot plastic being formed thereon is acceptable, and even desirable, to form an excellent bond between the two plastics, but the ends 82, 84, 86 and 88 must not melt.

In a preferred embodiment, the plastic used to form plastic support means 52 is essentially the same plastic used to form housing 14. Since polyethylene is preferred for housing 14, polyethylene is preferred for plastic support means 52. An essential difference between the two plastics, however, relates to the compatibility with the hot rotational molding process. For example, a linear polyethylene may be used to form housing 14, which facilitates the rotational molding process because of relatively low processing temperatures, while a cross-linked polyethylene may be used to form plastic support means 52. It would also be suitable to provide the polyethylene of the plastic support means 52 with an additive selected to (1) increase the softening and melting temperature of plastic support means 52, or (2) to increase the structural integrity of the plastic support means 52, or both. For example, short glass fibers may be added to the plastic, which improve the structural integrity of the plastic support means 52.

Figure 4:
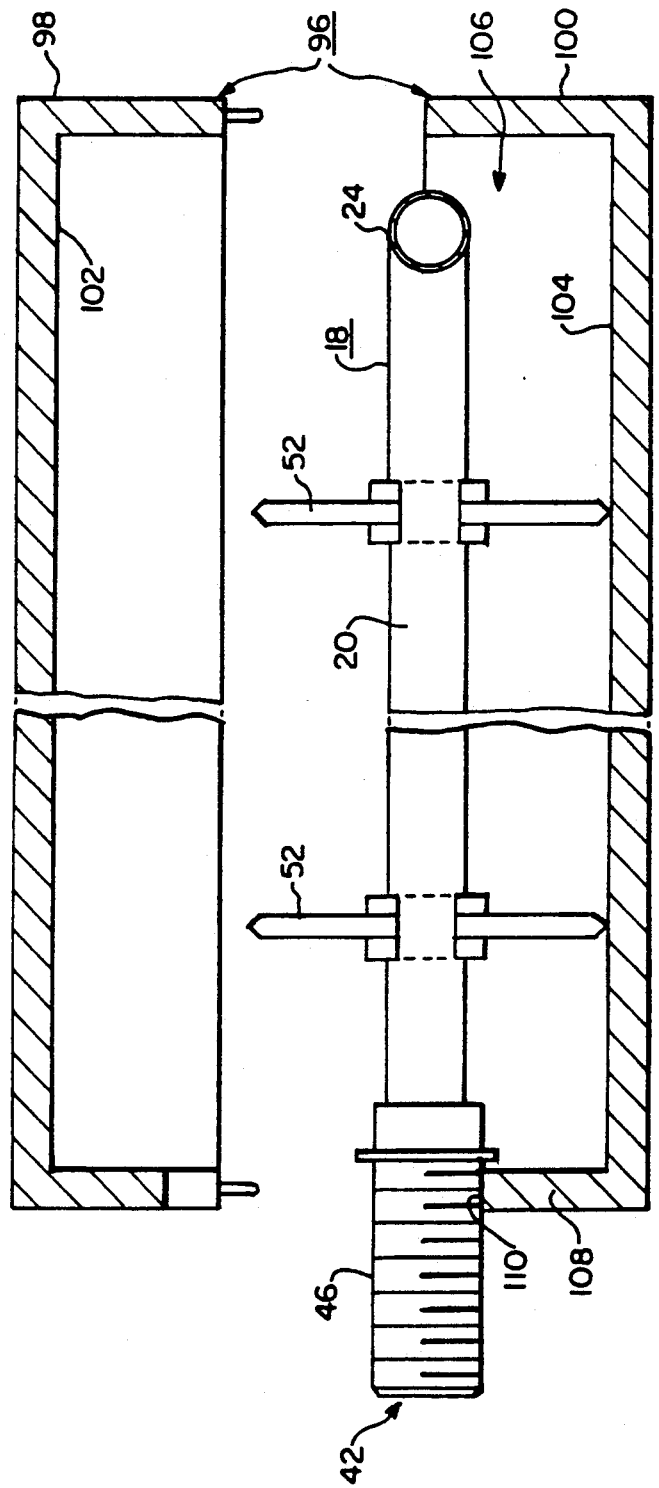
FIG. 4 is a cross sectional view of a rotational mold illustrating the support element of FIGS. 2 and 3 used to support and properly position an evaporator tube within the mold cavity while constructing a eutectic beam according to new and improved methods of the invention.

A preferred method of constructing eutectic beam 12 is illustrated in FIG. 4. FIG. 4 is cross sectional view through a rotational mold 96. Rotational mold 96 includes cooperative mold parts 98 and 100. Mold parts 98 and 100 have inner surfaces 102 and 104, respectively, which cooperatively define a cavity 106 when coupled or assembled. Rotational mold 96 further includes a wall portion 108 which defines openings 110 through which ends 42 and 44 of the first and second leg portions 20 and 22 of evaporator tube 18 extend.

The method of the invention continues with the step of placing the requisite number of plastic support means 52 on each leg portion 20 and 22, with the number on each leg portion depending upon the unsupported length of evaporator tube 18 from wall portion 108 to the end of bight 24, eg., placing support means 52 two to three feet (60–90 cm) apart. If cylindrical portion 52 were to be formed without the open side 66, the required number of plastic support means 52 would have to be placed on each leg portion 20 and 22 before the fittings 46 and 48 are attached to the ends of evaporator tube 18. The open side 66 conveniently allows the plastic support means 52 to be placed on leg portions 20 and 22 either just before placing evaporator tube 18 in mold 96, or after it is in the mold, as desired, as the plastic support means 52 is merely snapped on a leg portion 20 or 22 and slidably moved along the associated leg portion to the desired position.

The method continues by placing the U-shaped evaporator tube 18 in a mold part, such as mold part 100, and assembling the mold parts 98 and 100. By dimensioning the plastic support means 52 such that the support legs are slightly flexed by the mold surfaces 102 and 104 when the mold parts 98 and 100 are assembled, the C-shaped cross section of the cylindrical portion 54 will tighten about the associated leg portion, to maintain the plastic support means 52 in the selected positions, notwithstanding rotating mold 96 about one or more axes during the rotational molding process.

The last step of the method rotationally molds the plastic housing 14 about evaporator tube 18, by either introducing powdered or granular plastic into a cold mold 96 and then heating the mold, such as in an oven, while the mold is suitably rotated; or, by releasing the finely divided plastic particles into mold 96 while the mold is being heated and suitably rotated, as is well known in the rotational molding art. The plastic melts on the hot mold surfaces 102 and 104 which define the mold cavity 106, building up the desired wall thickness of housing 14 about the ends 82, 84, 86 and 88 of support legs 68, 70, 72 and 74, embedding the ends 82, 84, 86 and 88 in the top and bottom 34 and 36 of housing 14, and firmly bonding them in the process. Mold 96 is then chilled, the mold parts 98 and 100 separated, and the housing 14 and evaporator tube 18 are stripped from the mold. Mold 96 includes means . (not shown) for providing a threaded opening in housing., 14, for a fitting through which eutectic solution 16 is introduced into housing 14.

Figure 5:
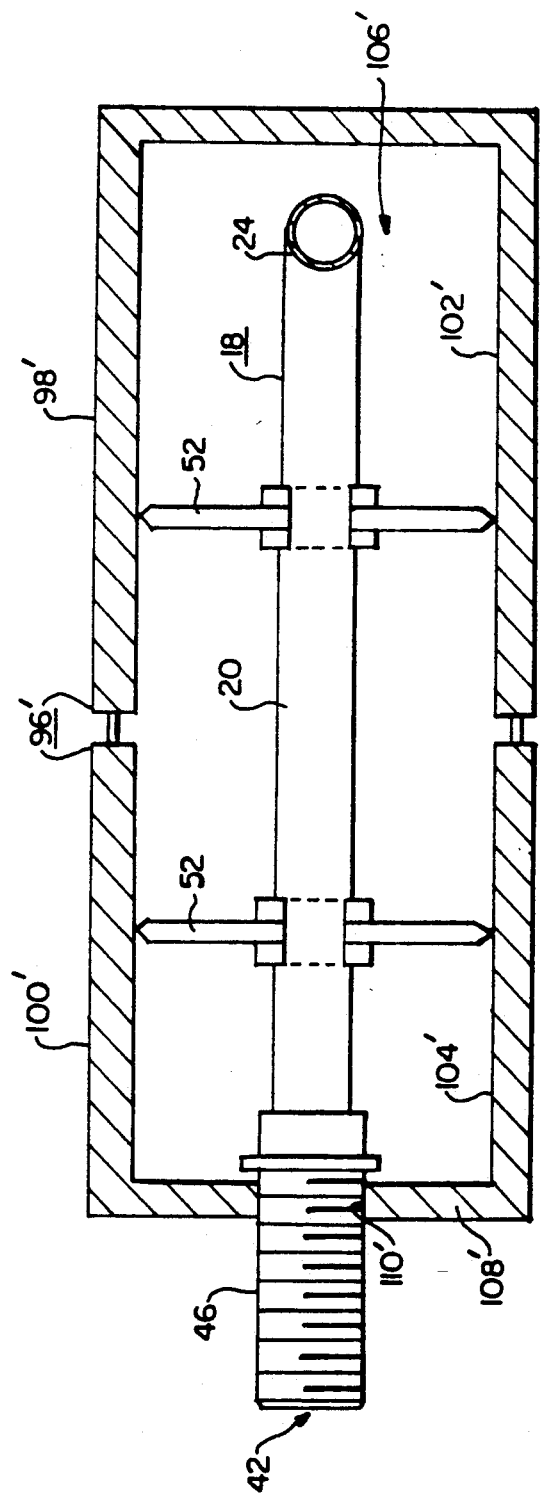
FIG. 5 is a cross sectional view of another type of rotational mold which may be used, with the support elements of FIGS. 2 and 3 also being shown to position the evaporator tube within the mold cavity.

FIG. 5 is a cross sectional view through a rotational mold 96', having mold parts 98' and 100', indicating that other rotational mold configurations may be used than the one illustrated in FIG. 4, with like reference numerals except for a prime mark indicating like functions.

Figure 6:
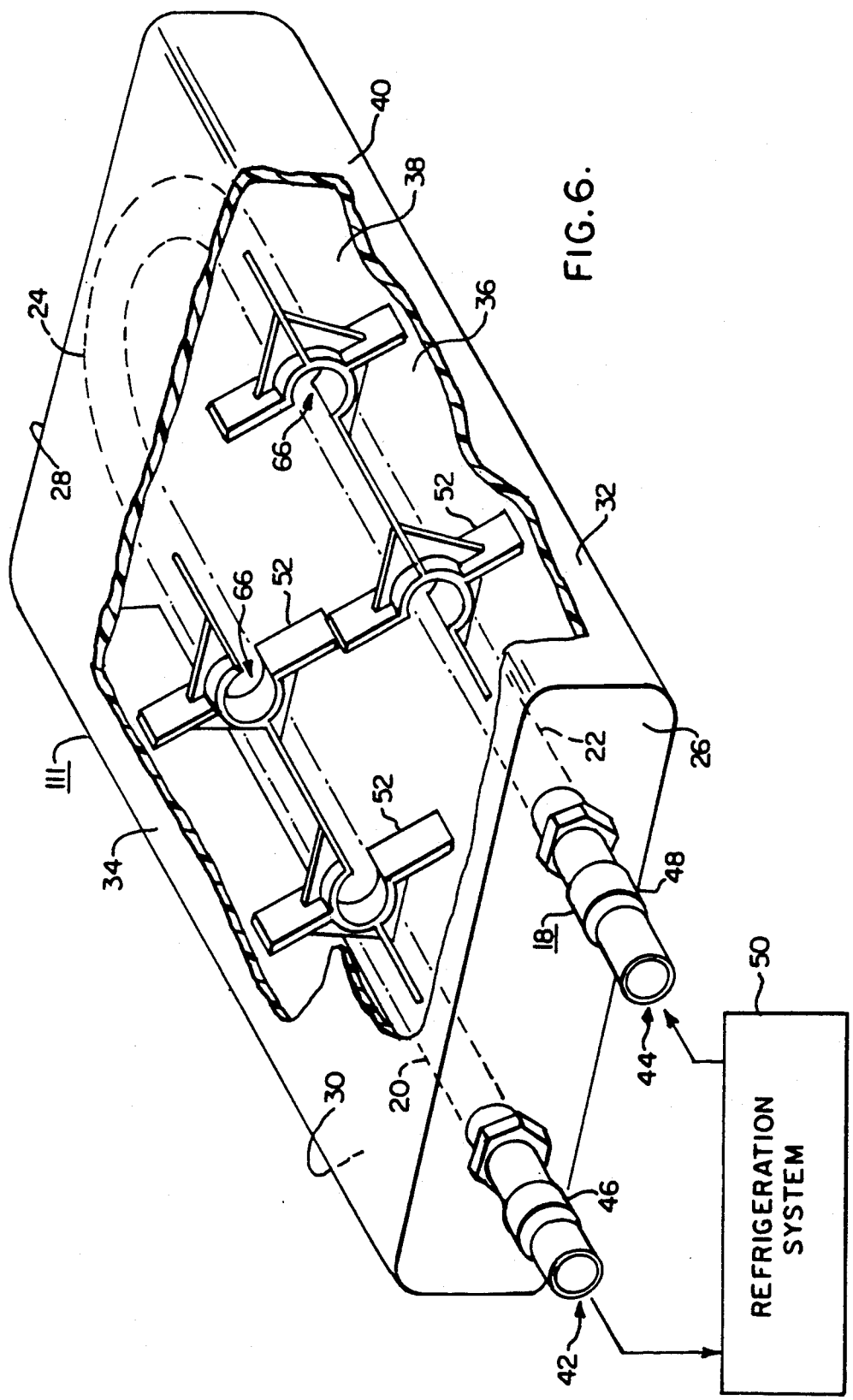
FIG. 6 is a perspective view, shown partially cut away, of a eutectic beam constructed according to the teachings of the invention, utilizing evaporator tube support elements constructed according to the embodiment of FIGS. 2 and 3.

FIG. 6 is a perspective view of a eutectic beam 111 constructed with the plastic support means 52, with like reference numerals indicating like elements which have already been explained in detail. As illustrated in FIG. 6, the plastic support means 52 should be oriented such that the open side 66 does not face the surfaces to which the ends 82, 84, 86 and 88 are bonded, ie., the top 34 or bottom 36 of housing 14, enabling the plastic support means 52 to be bonded to these two major surfaces without restricting volumetric expansion and contraction of housing 14 during freezing and thawing of eutectic solution 16.

If plastic support means 52 were to be constructed without the open side 66, then housing 14 would have to filled with less eutectic solution 16, or damage to the housing 14 and/or plastic support means 52 may result during freezing of the eutectic solution. Since the top and bottom portions 34 and 36 will expand more towards the central portion when the eutectic solution 16 is frozen, in a preferred embodiment of the invention, the open sides 66 of the plastic support means 52 are placed on the leg portions 20 and 22 such that the open sides 66 associated with leg portion 20 face the open sides 66 associated with leg portion 22, as illustrated in FIG. 6.

FIGS. 7 and 8 are side elevational and plan views, respectively, of a plastic support means 112 constructed according to another embodiment of the invention. In this second embodiment, the plastic support means 112 includes first and second support elements 114 and 116, joined together by an integral spacer member 118. Spacer member 118 is dimensioned to space the cylindrical support elements 114 and 116 by a dimension related to the spacing between leg portions 20 and 22 of evaporator tube 18. Support elements 114 and 116 respectively snugly but slidably surround leg portions 20 or 22 of the evaporator tube 18. Support elements 114 and 116 are generally cylindrical, tubular portions of plastic support means 112, being constructed as described relative to cylindrical portion 54 of plastic support means 52.

As in the first embodiment of the plastic support means, the walls of cylindrical portions 114 and 116 preferably do not define a complete circle, enabling the associated open sides 120 and 122 of cylindrical portions 114 and 116 to be pressed against leg portions 20 and 22, flexing each cylindrical portion and increasing the unstressed dimension between the ends of the C-shaped configuration until the cylindrical portion snaps about the leg portion, as hereinbefore described relative to plastic support means 52. The open sides 120 and 122 are preferably located about 180 degrees from the intersection of the spacer member 118 with the cylindrical portions 114 and 116, as illustrated in FIG. 7.

Plastic support means 112 includes a plurality of circumferentially spaced support legs, with four legs 124, 126, 128 and 130 being preferred. Support legs 124 and 130 extend radially outward from the cylindrical portion 114, starting at ends 132 and 134, respectively, of the C-shaped configuration of cylindrical portion 114. In like manner, support legs 126 and 128 extend radially outward from cylindrical portion 116. Support legs 124 and 130 are circumferentially spaced by an angle 136 of about 90 degrees, starting at the ends 132 and 134 of cylindrical portion 114, which ends define the open side 120, and support legs 126 and 128 are spaced apart by an angle 138 of about 90 degrees.

In order to provide additional stiffening and support to plastic support means 112, without adversely affecting the ability of support means 112 to flex and snap about leg portions 20 and 22, integral webs or ribs 140 and 142 may be provided on the upper and lower sides of cylindrical portions 114 and 116, and. Webs 140 and 142 lie in a common plane disposed centrally through cylindrical portions 114 and 116, bisecting their length dimensions. Web 140 in addition to being integrally attached to cylindrical portion 114, is additionally integrally attached to support legs 124 and 126, and to the spacer member 118. In like manner, web 142 is integrally attached to cylindrical portions 114 and 116, to support legs 130 and 128, and to spacer member 118.

The ends 144, 146, 148 and 150 of support legs 124, 126, 128 and 130, which become embedded in the plastic housing 14 during the preferred method of constructing the housing, may be tapered as illustrated in order to increase the surface area which is bonded to a housing wall. The tapering also reduces the chances of trapping leak causing air bubbles in the plastic housing as it forms about the ends of the support legs.

While the plastic support means 52 of the first embodiment may be placed on the evaporator tube 18 either before or after the evaporator tube 18 is placed in a mold part, the plastic support means 112 of the second embodiment is necessarily placed on the evaporator tube 18 before it is placed in a mold part, flexing the leg portions 20 and 22 of the evaporator tube 18 slightly apart as plastic support means 112 is positioned between the leg portions 20 and 22 and then snapped into position. Other than this requirement, the hereinbefore described method of manufacturing a eutectic beam with plastic support means 52 may be followed while using plastic support means 112.

Figure 9:
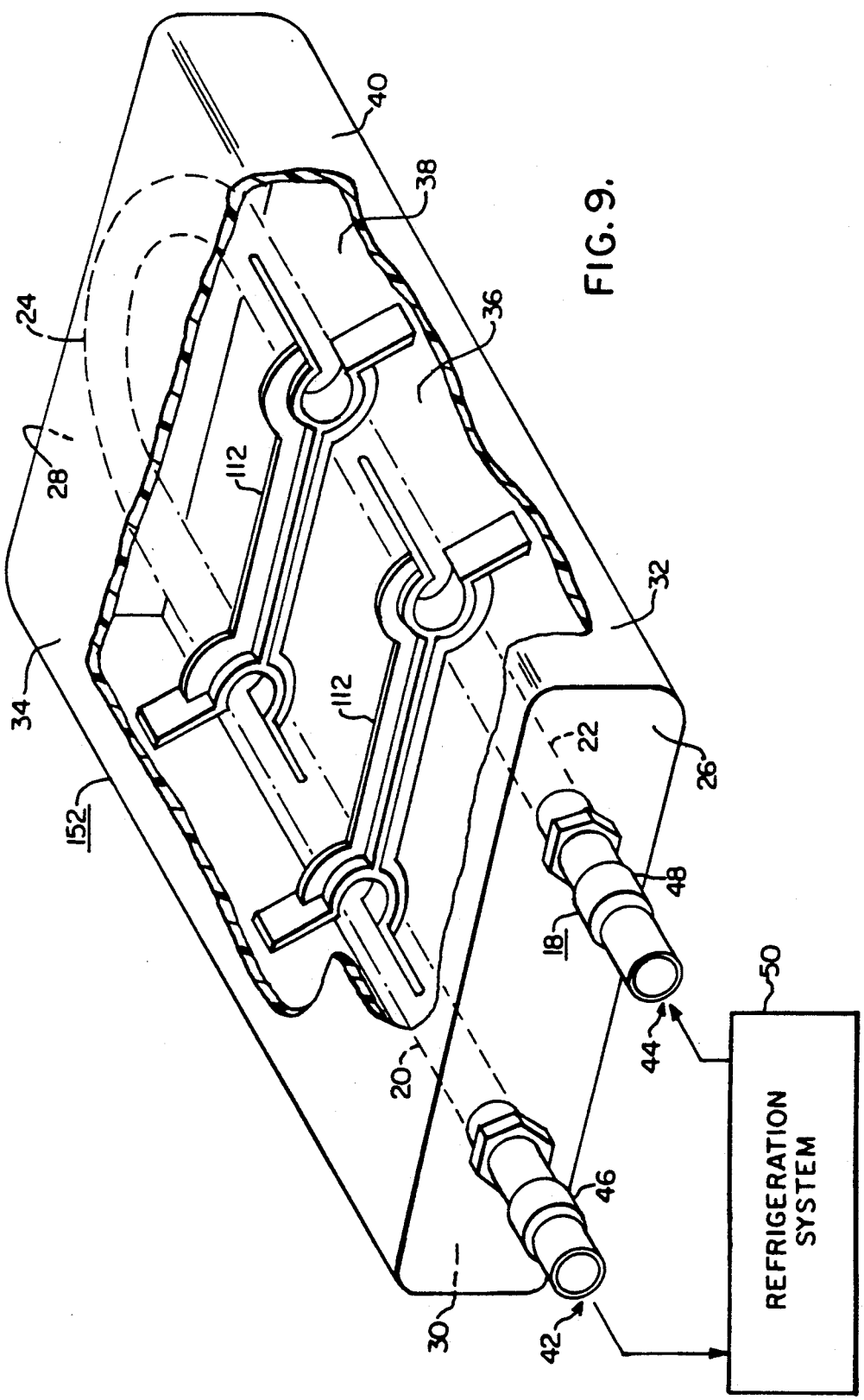
FIG. 9 is a perspective view, shown partially cut away, of a eutectic beam constructed according to the teachings of the invention, utilizing evaporator tube support elements constructed according to the embodiment of FIGS. 7 and 8.

FIG. 9 is a perspective view of a eutectic beam 152 constructed with the plastic support means 112, with like reference numerals indicating like elements which have already been explained in detail. As illustrated in FIG. 9, there is only one way to orient the plastic support means 112, with the open sides 120 and 122 being automatically oriented such that they do not face the housing surfaces to which the ends 144, 146, 148 and 150 are bonded, ie., the top 34 or bottom 36 of housing 14, enabling the plastic support means 112 to be bonded to these two major surfaces without restricting volumetric expansion and contraction of housing 14 during freezing and thawing of eutectic solution 16. The support legs are bonded to the top and bottom 34 and 36 near the side walls 30 and 32 of housing 14, with what little volumetric expansion which occurs near the side walls being easily accommodated by the open sides 120 and 122.

In summary, there has been disclosed a new and improved eutectic beam, and methods of constructing same, which includes unique plastic support means 52 and 112 which locates and supports the evaporator tube 18 during rotational molding of the housing 14, and which further supports the evaporator tube 18 during usage of the eutectic beam, significantly reducing stress and fatigue cracking of the evaporator tube 18 due to bumps encountered by the vehicles in which the eutectic beams are used. The plastic support means 52 and 112 both allow volumetric expansion of the housing during freezing, placing no additional limit on the amount of eutectic solution which may be added to housing 14, and the plastic support means 52 and 112 both allow thermal expansion to occur between the evaporator tube 18 and housing 14, as the evaporator tube is slidably supported.

I claim:

1. A method of manufacturing an eutectic beam which includes a U-shaped evaporator tube having first and second spaced leg portions, and a housing, comprising the steps of:

providing plastic support means which includes a generally cylindrical portion having support legs which extend outwardly therefrom, with the cylindrical portion defining an opening dimensioned to enable the support means to snugly but slidably surround a leg portion of the evaporator tube, and with the support legs having first ends integral with the cylindrical portion and second ends opposite the first ends, providing a rotational mold which includes cooperative mold parts having surfaces which defined a cavity, with the rotational mold including a wall portion having openings through which ends of the first and second spaced leg portions of the evaporator tube extend when the evaporator tube is assembled within the rotational mold, placing the plastic support means on the evaporator tube to snugly but slidably surround the first and second spaced leg portions of the evaporator tube, placing the U-shaped evaporator tube in a cooperative mold part of the rotational mold, assembling the cooperative mold parts of the rotational mold about the U-shaped evaporator tube such that the second ends of the support legs of the plastic support means contact predetermined inner surfaces of the mold cavity defined by the cooperative mold parts and such that the ends of the first and second leg portions of the evaporator tube extend through the openings defined in the wall portion of the rotational mold, to thereby position the evaporator tube within the mold cavity by means of the openings in the wall portion of the rotational mold through which the ends of the first and second leg portions of the evaporator tube extend, and by means of the second ends of the support legs of the plastic support means which contact the predetermined inner surface of the mold cavity, and rotationally molding a plastic material within and against predetermined inner surfaces of the mold cavity to provide a plastic housing in spaced relation about the first and second spaced leg portions of the evaporator tube and thus form the eutectic beam, such that the support legs of the plastic support means extend through the space between the first and second leg portions of the evaporator tube and the plastic housing, and such that only the second ends of the support legs of the plastic support means become embedded in wall portions of the molded plastic housing, whereby the support legs of the plastic support means additionally provide positional support for the evaporator tube located within the rotationally molded plastic housing during use of the eutectic beam comprising the evaporator tube and the rotationally molded plastic housing.

2. The method of claim 1 including the step of constructing the plastic support means such that the second ends of the support legs of the plastic support means maintain physical integrity during the step of rotationally molding the plastic housing.

3. The method of claim 1 including the step of selecting the plastic of which the plastic support means is constructed to be compatible with the plastic material of which the plastic housing is rotationally molded, whereby the plastic of the housing is firmly bonded to the plastic of the plastic support means.

4. The method of claim 1 wherein the plastic support means includes first and second discrete support elements, each element having a cylindrical portion and a plurality of support legs which extend outwardly therefrom, and wherein the step of placing the plastic support means on the evaporator tube includes respectively placing the first and second discrete support elements on the first and second leg portions of the evaporator tube.

5. The method of claim 1 wherein the step of providing the plastic support means provides first and second cylindrical portions, each cylindrical portion having support legs extending outwardly therefrom, with the cylindrical portions being spaced by a joining member integrally attached to both cylindrical portions, with the joining member spacing apart the first and second cylindrical portions with a spacing substantially equal to a spacing between the spaced leg portions of the evaporator tube, and wherein the step of placing the plastic support means on the evaporator tube respectively places the first and second cylindrical portions on the first and second leg portions of the evaporator tube.

6. The method of claim 1 wherein the step of providing plastic support means provides a cylindrical portion which defines a substantially C-shaped configuration, including a gap therein having a predetermined dimension, with the step of placing the plastic support means on the evaporator tube including the step of snapping the cylindrical portion about the leg portion of the evaporator tube, and including the step of positioning the gap of the C-shaped configuration relative to the support legs such that movement of the wall portion of the housing in which the second ends of the support legs are embedded is accommodated by flexing of the C-shaped configuration and changing of the predetermined dimension of the gap in the C-shaped configuration.

* * * * *